(12) United States Patent
Winston

(10) Patent No.: US 6,467,916 B2
(45) Date of Patent: Oct. 22, 2002

(54) LIGHT TRANSMISSION DEVICE

(75) Inventor: Roland Winston, Chicago, IL (US)

(73) Assignee: Arch Development Corp., Chicago, IL (US)

(*) Notice: Subject to any disclaimer, the term of this patent is extended or adjusted under 35 U.S.C. 154(b) by 0 days.

(21) Appl. No.: 09/875,820

(22) Filed: Jun. 6, 2001

(65) Prior Publication Data

US 2002/0018308 A1 Feb. 14, 2002

Related U.S. Application Data

(63) Continuation of application No. 09/559,623, filed on Apr. 27, 2000, now abandoned, which is a continuation of application No. 09/122,136, filed on Jul. 24, 1998, now abandoned
(60) Provisional application No. 60/053,763, filed on Jul. 25, 1997.

(51) Int. Cl.[7] .................................... G02B 5/10
(52) U.S. Cl. .................... 359/853; 359/869; 126/684
(58) Field of Search ................ 359/850, 851, 359/852, 853, 867, 869; 126/684, 690, 692, 694, 695, 702

(56) References Cited

U.S. PATENT DOCUMENTS

| 4,024,852 A | * | 5/1977 | L'Esperance et al. |
| 4,120,565 A | * | 10/1978 | Rabl et al. |
| 4,432,345 A | * | 2/1984 | McIntire ............... 126/439 |
| 4,667,112 A | * | 5/1987 | Grossman ............. 250/503.1 |
| 5,921,667 A | * | 7/1999 | Raby, Sr. et al. ......... 362/346 |

* cited by examiner

Primary Examiner—Mark A. Robinson
(74) Attorney, Agent, or Firm—Michael D. Rechtin; Foley & Lardner

(57) ABSTRACT

A non-imaging optical system for operating on light using broken symmetry reflector surfaces (30). The theoretical upper limit for concentration of direct solar radiation at low latitudes with stationary concentrators is determined from the projected solid angle sampled by the apparent motion of the sun. Based on the fact that the solar radiation is not uniformly distributed within this projected solid angle, we derive higher concentrations which apply when rejecting the lower density radiation. Trough type systems, which have translational symmetry, cannot be ideal stationary concentrators. Efficiency is improved by using broken symmetry for surfaces of the reflector (30) and the light source or concentrator. We note that what applies to concentrators applies equally to reflectors for illumination.

7 Claims, 3 Drawing Sheets

LIGHT TRANSMISSION DEVICE

This application is a continuation of U.S. Ser. No. 09/559,623, filed Apr. 27, 2000 and now abandoned, which is a continuation of non-provisional application Ser. No. 09/122,136, filed Jul. 24, 1998 and now abandoned, which is based in part on provisional application No. 60/053,763, filed on Jul. 25, 1997, of which the benefit of priority is claimed. The United States Government has certain rights in this invention pursuant to Grant #DE-FG02-87ER13726 from the U.S. Department of Energy to the University of Chicago.

BACKGROUND OF THE INVENTION

This invention relates to devices for the transmission of radiation, especially of light. In particular, it is a non-focussing reflector for the concentration of radiation such as sunlight at a desired region over a wide range of angles of incidence, and it is a non-focussing reflector for the reflection of radiation such as light over a relatively large solid angle.

A number of systems for passive or non-tracking concentration of solar energy have been produced in the past. Among such systems are those shown in U.S. Pat. Nos. 5,537,991; 3,957,041; 4,002,499; 4,003,638; 4,230,095; 4,387,961; 4,359,265 and 5,289,356, all of which are incorporated here by reference as if set forth fully. A common characteristic of these systems is the use of smooth surfaces to reflect light from the sun on a region to be heated. This is also true with most non-focussed reflectors, which are similar in construction such that it is appropriate to refer to the reflectors as light-transmission devices because it is immaterial whether the reflectors are concentrating radiation from a large solid angle of incidence or broadcasting radiation from a relatively small source to a relatively large solid angle.

Concentration of radiation is possible only if the projected solid angle of the radiation is increased. This requirement is the direct consequence of the law of conservation of the etendue, which is the phase space of radiation. Solar concentrators which achieve high concentration must track the sun; that is, they must continuously reorient in order to compensate for the apparent movement of the sun in an earth center (Ptolemaic) coordinate system. Reflectors, in contrast, are fixed in position for most lighting purposes. For tracking collectors the direction to the center of the sun is stationary with respect to their aperture. Such concentrators can achieve very high concentrations of about 45000 in air. Even higher concentrations have been achieved inside transparent media.

Tracking, however, is technically demanding because solar collectors are commonly fairly large and designing these systems for orientational mobility may add significantly to their cost. Moreover the absorber, which incorporates some heat transfer fluid as well as piping, also may need to be mobile. This is the motivation to study the concentration which can be achieved with stationary, non-tracking devices. The same principles apply when it is desired to deliver light or other radiant energy from a source to a relatively large solid angle.

First we derive the theoretical upper limits, without reference to any particular type of concentrators. We then focus on trough-type or linear systems, which posses a translational invariance along one direction. We show that trough systems are not ideal as stationary concentrators. For troughs more stringent upper limits apply.

The annual movement of the earth around the sun in a nearly circular orbit combined by the daily rotation around its axis which is inclined by the angle δ, to the plane of its orbit (the ecliptic) accounts for an apparent movement of the sun in an earth-based coordinate system. We follow the same notation and use a coordinate system with one axis oriented horizontally East to West. The second axis points North to South, parallel to the axis of the earth, that is inclined with respect to the local horizontal direction by an angle equal to the latitude. The third axis, perpendicular to the other two, points toward the sun at noon, at equinox. This coordinate system corresponds to the common orientation of a stationary concentrator. A unit vector pointing in a certain direction is represented by its component $k_E$ along the E-W axis and its component $k_N$ along the N-S axis. The third component, $k_H$ is known from normalization. Area elements in the $k_E$, $k_N$ space correspond to projected solar angle and can be used to assess concentration.

The apparent direction of the sun is given to a very good approximation by $$k_N = -\sin \delta_o \cos(\omega_y t)$$

$$k_E = -\sqrt{1-k_N^2}\sin(\omega_d(t+T))$$

where $\omega_y = 2\pi/\text{year}$ describes the yearly angular orbital movement, $\omega_d = 2\pi/\text{day}$ describes the angular daily rotation and t the time since equinox. The correction T comprises a constant offset, the time difference between nearest local noon and equinox, as well as time-dependent correction known as the equation of time, which is due to the deviation of the earth's orbit from a circular path. This correction varies slowly in the course of one year by a maximum of ±15 minutes. Its effects are negligible for the purpose of this work. The declination angle $\delta_o = 23.45$ degrees is the angle between the plane of the yearly orbit, the ecliptic, and the polar axis of rotation of the earth.

The movement of the sun is visualized in FIG. 4. To a good approximation, the sun moves in the course of a day along a straight line $k_N \approx \text{const.}$ parallel to the W-E axis. In the course of a year, the daily path oscillates between a maximum value at summer solstice and a minimum at winter solstice. This is indicated by the parallel lines which describe 36 sample days at equal time spacing over one year.

First we note that a surface oriented parallel to the axes chosen receives solar radiation only from inside the band $$-\sin(\delta_o + \alpha_{pullout;zu613400.900}) \leq k_N \leq \sin(\delta_o + \alpha_3)$$

Here $\alpha_3 = 4.7$ mrad is the half-angle subtended by the sun. It adds to the declination in order to account for rays from the rim of the solar disk.

A stationary concentrator which accepts radiation only from this band can achieve a maximum concentration, without rejecting any radiation, equal to the ratio of the area of the entire circle to the area of the band given by Eq. (2), that is $$C_{max} = \frac{\pi}{2(\delta_o + \alpha_3) + \sin(2\delta_o + 2\alpha_3)} \approx 2.0$$

The value in Eq. (3) applies for an ideal device required to accept all rays. If we analyze FIG. 1, it is apparent that the radiation is not uniformly distributed within the band described by Eq. (2). The solar path spends more time near the extremes than in the center. We define the average relative radiance from a certain direction as the ratio of the radiance received from this direction to that constant radiance which we would receive from the same direction if the same power would be homogeneously distributed over all regions of the celestial sphere. This relative radiance is proportional to:

$$B^P(k_N, k_E) \sim \frac{1}{\sqrt{\sin^2\delta_o - k_N^2}} = B^P(k_N)$$

where $d_t$ denotes the time derivative and P the radiative power. In the numerator $\omega_y\omega_d$ describes the frequency a region is visited, the root describes the intensity of a point source, proportional to the cosine of the incidence angle, or the ratio of solid angle to projected solid angle. The denominator accounts for the time the sun spends in an interval $dk_N dk_E$. Substituting the time derivatives $$|d_t k_N| = \sin\delta_o \omega_y \sqrt{1 - \left(\frac{k_N}{\sin\delta_o}\right)^2}$$

$$|d_t k_E| = \omega_d \sqrt{1 - k_N^2} \sqrt{1 - \frac{k_E^2}{1 - k_N^2}} - \omega_d \sqrt{1 - k_E^2 - k_N^2}$$

into Eq. (4) yields for the relative intensity $$B^P(k_N, k_E) \sim \frac{1}{\sqrt{\sin^2\delta_o - k_N^2}} = B^P(k_N).$$

In Eq. (6) we neglected the term proportional to ~ because $w_y$ because $\omega_y \ll \omega_d$. Note that the radiance distribution does not depend on $k_E$; it is constant along directions of equal latitude.

Consequently we dropped the dependence on $k_E$. The decrease in speed in the W-E direction in the morning and evening is compensated by the cosine effect, whereas the decrease in speed in the S-N direction at the solstices is not. Equation (7) is strictly valid only in the limit of negligible size of the solar disk. This is a good approximation everywhere except at $k_N = \sin\delta_o$, where for a point sun the relative radiance would be infinite. To account for the finite size of the sun, the relative radiance needs to be averaged over the solar disk:

$$B(k_N) = \frac{2}{\pi} \int_{x=-1}^{x=1} \sqrt{1-x^2}\, B^P\left(k_N + x\alpha_3\sqrt{1-k_N^2}\right) dx$$

The first square root is the cord of the solar disc, the second describes the distortion due to the projection. Accounting for the finite size of the sun keeps the relative radiance distribution finite. The relative radiance distribution as a function of $k_N$ is shown in FIG. 2. The radiance around the center is approximately a factor of $2/\pi$ of its average value over the entire band.

By rejecting lower density radiation a device can reach higher concentration values than $C_{max}$ albeit at the price of reduced collection efficiency. A complete description must specify a limit curve of efficiency versus concentration such that no higher efficiency for given concentration nor higher concentration for given collection efficiency can be reached. Similar situations are frequently encountered in analyzing theoretical limits for optical devices. Assume radiation from the sun is rejected during a certain fraction of the year, centered around the equinoxes. Then the collection efficiency is reduced by the same factor. However, the concentrator need not accept radiation from the center of the band, therefore the concentration is higher.

Accepting all radiation above a certain brightness and none below leads to an optimal device in the sense that no higher efficiency at the same concentration nor higher concentration at the same efficiency are possible. This can be argued by making the contrary assumption: a concentrator that accepts some radiation of brightness $B_1$ and not all radiation of brightness $B_2 > B_1$. Then modifying the concentrator by diminishing the amount of radiation accepted at $B_1$ and increasing that of $B_2$ by the same amount increases the concentration without affecting the collection efficiency. Increasing the accepted phase space around $B_2$ by the same amount the phase space at $B_1$ is reduced increases the collection efficiency without changing the concentration.

In FIG. 3 we show the efficiency versus concentration for an ideal stationary concentrator, calculated by assuming that increasingly wide bands of phase space are excluded by increasing the brightness limit for acceptance. With the normalization used here, namely that the average brightness is unity, the peak value of the brightness corresponds to the maximum concentration that can be reached in the limit of zero collection efficiency. As FIG. 6 indicates this value is around 12 for an ideal stationary concentrator.

Note that the concentration derived this way is an average value, averaged over all times. In practice the device will have zero efficiency over two equal periods centered around the solstices and ideally unit efficiency during the rest of the year. We may therefore justify relating the radiation collected to the operation time only. This is visualized in FIG. 4 showing significantly higher concentrations.

All conclusions in this section apply to the direct radiation only. We neglected any scattering or absorption in the atmosphere. In reality the solar radiation on earth can often be adequately modeled as a direct part and a totally diffuse part, where the fractions depend on the particular climate. This work then applies to the direct part only. The diffuse part cannot be concentrated. The fraction of the diffuse part that is collected is exactly equal to the fraction of phase space accepted. We also neglected reflectivity losses; therefore, collection efficiency here is used synonymously to optical throughput. The distribution in FIG. 4 is strictly valid only at the equator. At higher latitudes it may happen that the edges of the solar band lie outside the visible horizon for a concentrator oriented parallel to the polar axis, i.e. inclined at the latitude angle.

Based on the band shaped structure of the phase space, or on the essentially one dimensional apparent motion of the sun, solar collectors, which have a translational symmetry, have been built and actually are the most successful energy producers today. This means that there is one spatial direction, parallel to one of the tangents of the reflector at every location. Consequently the component of the radiation in that particular direction is not changed by the reflection independent of the incidence point. By using the same symmetry for the absorber, usually a tube or a fin, the entire problem is two-dimensional. For these reasons trough-type concentrators are sometimes also called 2-D devices. One would hope to have a concentrator matched to the phase space presented by the solar geometry.

Unfortunately this is not true. Assume that a trough solar collector is oriented with the translational axis in the E-W direction. Assume further that this concentrator has been designed to accept all rays incident within $-\theta$ to $\theta$ in a projection onto the meridional plane. In terms of the coordinate system used here, rays are accepted if and only if $$\left|\frac{k_N}{k_H}\right| \le \tan\theta.$$

Using the normalization of the direction vector $$k_N^2 + k_W^2 + k_H^2 = 1,$$

allows to eliminate $k_H$. This leads to $$\frac{k_N^2}{\sin^2\theta} + k_E^2 \le 1.$$

This represents an ellipse with the N-S axis equal to sin θ and the E-W axis equal to unity.

The derivation above shows that for a trough-type concentrator of any cross section the acceptance function depends only on the ratio $k_N/k_H$. Any two rays which have the same value for this ratio, but may differ in the third component, along the translation axis, are optically indistinguishable. In the projection onto the aperture, therefore the isoacceptance lines are ellipses with the axis, parallel to the translational axis, equal to unity. In FIG. 1 we have indicated the region accepted by an ideal trough-type CPC of 35 degrees acceptance angle by the dotted ellipse. One caveat needs to be added in this context. We have ignored the possible dependence of absorptivity at the absorber and of the reflectivity on the true (not projected) incidence angle, in the spirit of idealization. This effect is small in most practical systems.

Based on the fact that rough collectors have isoacceptance lines defined by Eq. (11) we calculate the solar power $B^T(\sin\theta)$ between two isoacceptance ellipses separated by an interval dsin θ

$$B^T(\sin\theta) = \frac{dP}{d\sin\theta}$$
$$= \int_{k_g=-1}^{k_g=1} \sqrt{1-k_E^2}\, B\!\left(k_N = \sin\theta\sqrt{1-k_E^2}, k_E\right) dk_E$$

This is the one-dimensional distribution appropriate to evaluate the performance of ideal trough-type systems. It is visualized in FIG. 5.

First we note that the distribution is nowhere zero. This signifies that trough-type collectors cannot achieve any concentration without sacrificing collection efficiency. However, the distribution is not uniform. Thus rejecting radiation where the density is below some limit does allow concentration with stationary trough-type concentrators for the price of sacrificing collection efficiency.

We have calculated the upper limit for the characteristic curve of trough-type concentrators by calculating the collection efficiency and the phase space accepted if radiation is accepted only if the brightness exceeds a predefined limit. This curve is shown in FIG. 6. For comparison we show as dotted line the upper limit of an ideal (non trough) concentrator as plotted in FIG. 3. Again the normalization is such that the average value is unity. Therefore the peak value corresponds to the highest possible concentration reachable in the limit of zero collection efficiency. For an ideal stationary trough-type concentrator this value is roughly 5.

Note that the performance of the trough-type concentrator is significantly lower than the general upper limit. This shows that trough-type collectors are not well matched to band shaped phase space. For stationary concentrators this has been known, and the performance of trough type collectors as stationary concentrators has been derived. Here we have shown the basic reasons the translational invariance of trough collectors does not allow them to approach the ideal upper limits.

The apparent motion of the sun occupies only 50% of the sky, in appropriate phase space measure, so that concentration by a factor of 2 should be achievable by stationary concentrators without sacrificing collection efficiency. Furthermore the apparent position of the sun in the sky is not uniformly distributed. This fact allows even higher concentration ratios with stationary collectors designed to operate only for a part of the year, around the solstices.

SUMMARY OF THE INVENTION

A light-transmission device in either linear (trough-like) or three dimensional (such as, spherical) symmetry is used as a passive (non-focussed, non-tracking) solar collector or as a non-imaging distributor of radiation. A pattern of corrugations, or other broken symmetries, in such geometries provides a wider acceptance angle of collection and a larger solid angle of radiation. The corrugations may be smooth or angular, and can be optimized for configurations.

BRIEF DESCRIPTION OF THE DRAWINGS

Referring to FIG. 1 the path of travel of the sun can be represented in phase space by two well known components, namely the direction vectors $k_N$ and $k_{E(or\ W)}$. The daily path is virtually a straight line, and in the course of the year, the path of travel oscillates between two extremes $k_N$. The paths for 36 days are shown at equal intervals over the year. The dotted ellipse describes the accepted region of the trough-type prior art CPC (compound parabolic concentrator) of 35° acceptance angle. As noted hereinbefore, the performance of the trough-type concentrator is significantly lower than the general upper limit available. This shows that trough-type collectors are not well matched to the illustrated band shaped phase space. For stationary concentrators this has been known, and the performance of trough-type collectors as stationary concentrators has been derived. Here we have shown the basic reasons the translational invariance of trough collectors does not allow them to approach the ideal upper limits.

Figure 1:
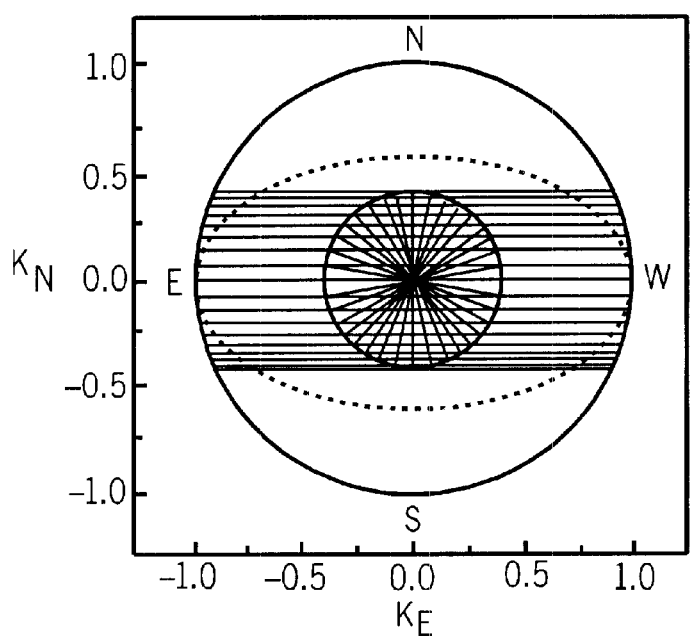
FIG. 1 is a plot of direction vectors of the sun.
Figure 2:
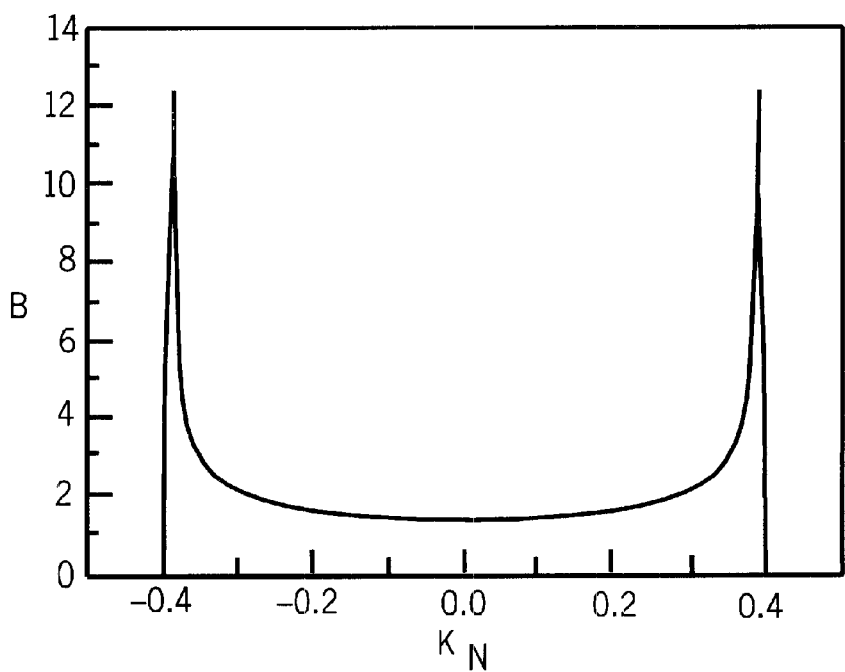
FIG. 2 is a plot of relative radiance of the sun as a function of the direction coefficient.

The apparent motion of the sun occupies only 50% of the sky, in appropriate phase space measure, so that concentration by a factor of two should be achievable by stationary concentrators without sacrificing collection efficiency. Furthermore the apparent position of the sun in the sky is not uniformly distributed. This fact allows even higher concentration ratios with stationary collectors designed to operate only for a part of the year, around the solstices.

In order to improve performance over the prior art, a light-transmission device in either linear (trough-like) or three dimensional (such as, spherical) symmetry is used as a passive (non-focussed, non-tracking) solar collector or as a non-imaging distributor of radiation. A pattern of corrugations, or other broken symmetries, in such geometry's provides a wider acceptance angle of collection and a larger solid angle of radiation. The corrugations may be smooth or angular, and can be optimized for configurations.

In summary, we have shown that any translationally invariant trough type concentrator has an angular acceptance that does not match the apparent solar motion, and that the performance of collectors can be improved by breaking up selected aspects of symmetry-imposed constraints. Therefore, breaking of symmetry can be applied to two and three dimensional structures to improve performance. Several examples of ways to break up such symmetries includes forming straight line or planar discontinuities (sharp folds which form discontinuities) or smooth discontinuities, such as sinusoidal changes in amplitude and frequency.

What is claimed is:

1. A solar transmission device comprising:
    a trough-type shaped solar reflector extending along a longitudinal axis, the reflector having an inner non-prismatic reflective surface, and
    the inner non-prismatic reflective surface having a variable broken symmetry structure which defines a non-elliptical phase space acceptance range for the variable broken symmetry structure resulting in a substantially band like shape for the acceptance zone over a solar year with a direction vector $k_N$ substantially nonvarying with a $k_E$ direction vector.

2. The solar transmission device of claim 1 wherein the solar reflector comprises one of a non-tracking solar collector and a non-imaging radiation distributor.

3. The solar transmission device of claim 1 wherein the non-elliptical phase space acceptance range is substantially a rounded end, rectangular shape characteristic of a band shaped solar phase space characteristic of motion of the sun with respect to the earth.

4. The solar transmission device of claim 1 wherein the broken symmetry structure is selected from the group consisting of smooth corrugations, jagged corrugations, angular corrugations, irregular corrugations, straight-line discontinuities, sinusoidal contours, planar discontinuities, and a combination thereof.

5. The solar transmission device of claim 1 wherein the broken symmetry structure comprises a set of broken corrugations generally transversely extending across the longitudinal axis of the reflector.

6. The solar transmission device of claim 1 wherein the reflector comprises a compound parabolic shape.

7. The solar transmission device of claim 1 wherein the reflector comprises a non-focusing reflector shape.

* * * * *

UNITED STATES PATENT AND TRADEMARK OFFICE
CERTIFICATE OF CORRECTION

PATENT NO. : 6,467,916 B2
DATED : October 22, 2002
INVENTOR(S) : Winston

It is certified that error appears in the above-identified patent and that said Letters Patent is hereby corrected as shown below:

Column 2,
The third stand alone equation should be:
-- $-\sin(\delta_o + \alpha_3) \leq k_N \leq \sin(\delta_o + \alpha_3)$ --.

Column 3,
The last stand alone equation should be:
-- $$B(k_N) = \frac{2}{\pi} \int_{x=-1}^{x=1} \sqrt{1-x^2}\, B^p\left(k_N + x\alpha_3, \sqrt{1-k_N^2}\right) dx$$ --.

Signed and Sealed this

Fifteenth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,467,916 B2
DATED : October 22, 2002
INVENTOR(S) : Winston

Figure 4:
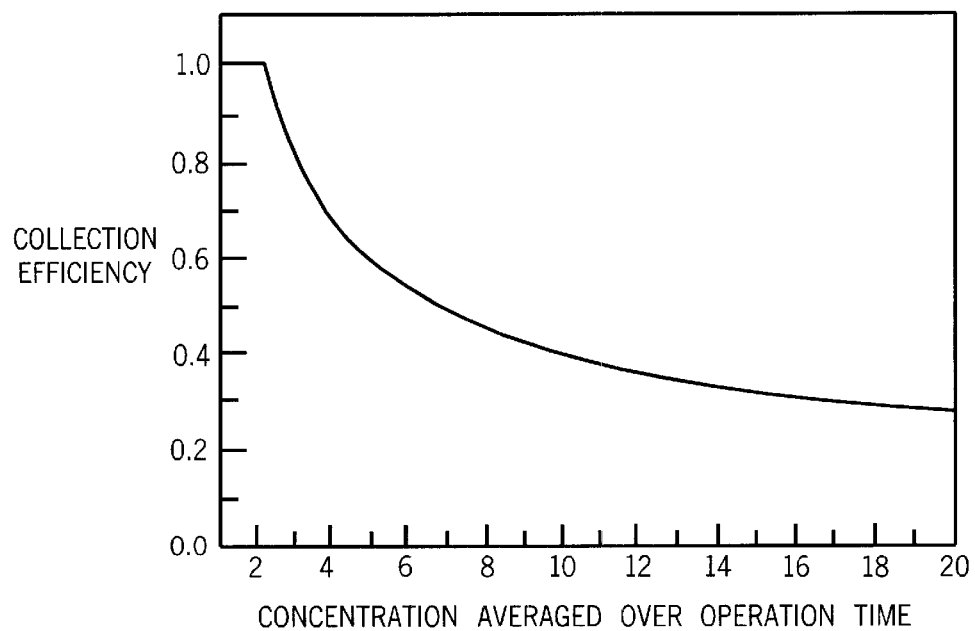
FIG. 4 is a plot of collection efficiency of an ideal stationary concentrator as a function of its concentration averaged over operation time.
Figure 5:
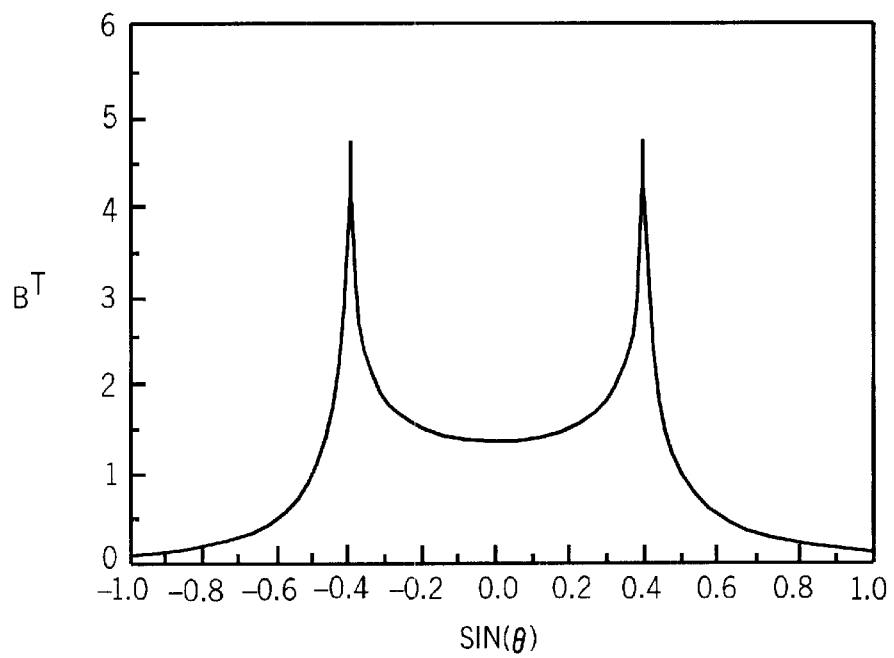
FIG. 5 is a plot of brightness distribution over projected incidence angle appropriate for a trough-type concentrator relative to uniform sky of equal irradiance.

It is certified that error appears in the above-identified patent and that said Letters Patent is hereby corrected as shown below:

Column 2,
Line 37, "FIG. 4" should be -- FIG. 1 --.

Column 3,
Lines 31 and 32, "~ because $w_y$" is omitted.

Figure 3:
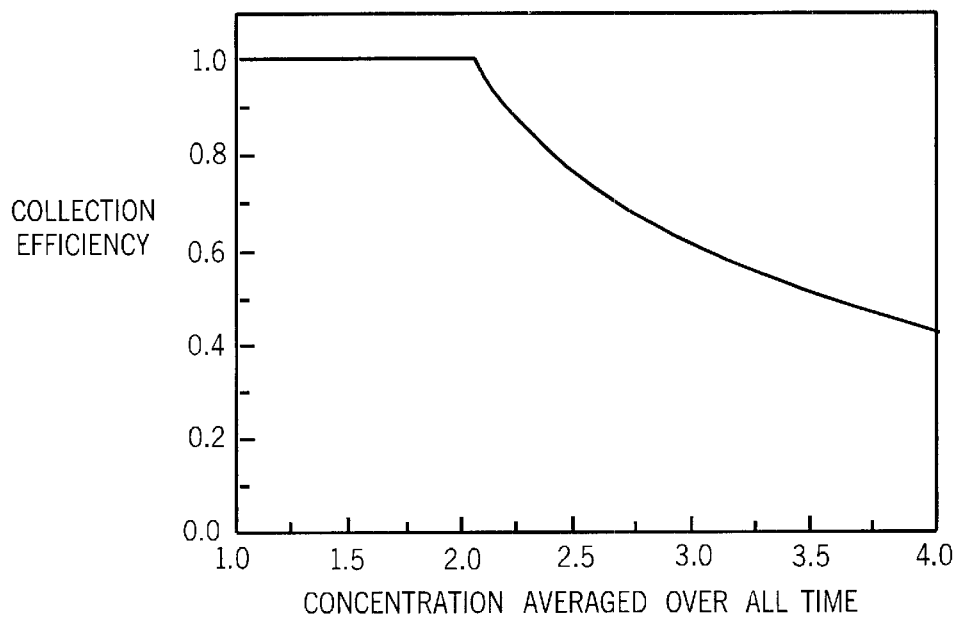
FIG. 3 is a plot of collection efficiency of an ideal stationary concentrator as a function of its concentration averaged over all time.
Figure 6:
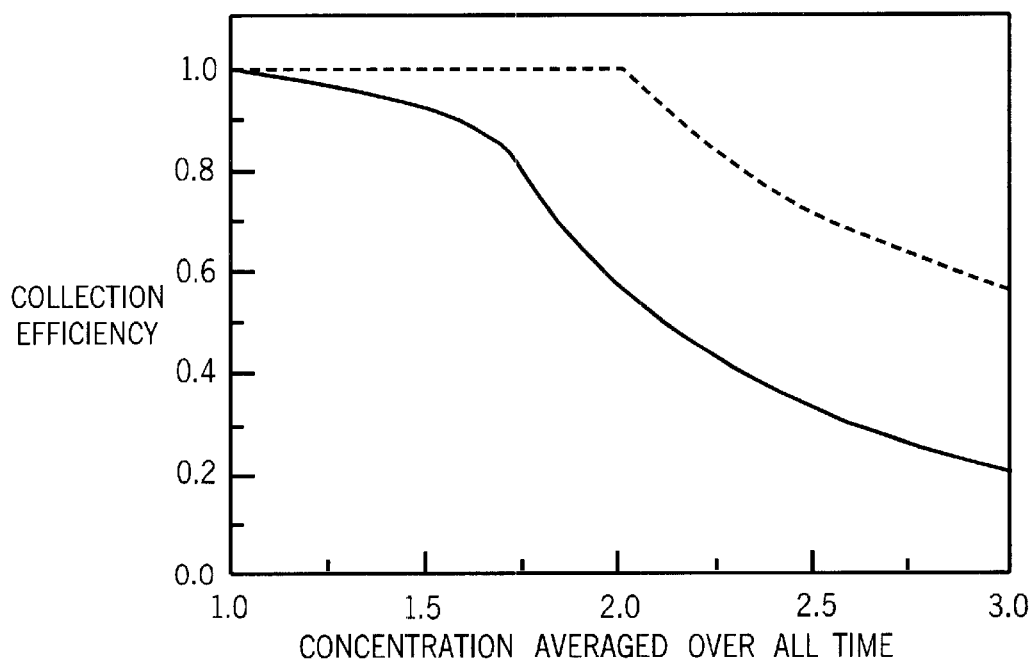
FIG. 6 is a plot of collection efficiency of an ideal stationary trough-type concentrator as function of its concentration averaged over all time.

Column 4,
Line 21, "FIG. 6" should be -- FIG. 3 --.

Signed and Sealed this

Second Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,467,916 B2
DATED : October 22, 2002
INVENTOR(S) : Roland Winston

It is certified that error appears in the above-identified patent and that said Letters Patent is hereby corrected as shown below:

<u>Title page,</u>
Item [60], Related U.S. Application Data, "60/053,763" is changed to
-- 60/053,764 --.

Signed and Sealed this

Seventh Day of March, 2006

JON W. DUDAS
*Director of the United States Patent and Trademark Office*